April 2, 1968  G. WOHLERT ET AL  3,375,994
WINDING DEVICE FOR SAFETY BELTS AND THE LIKE
Filed March 22, 1966
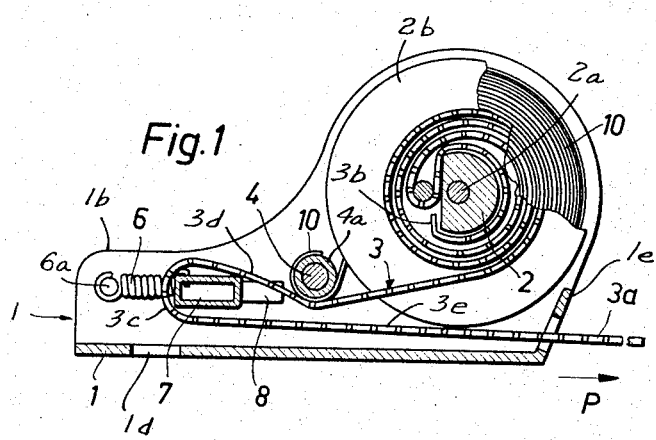
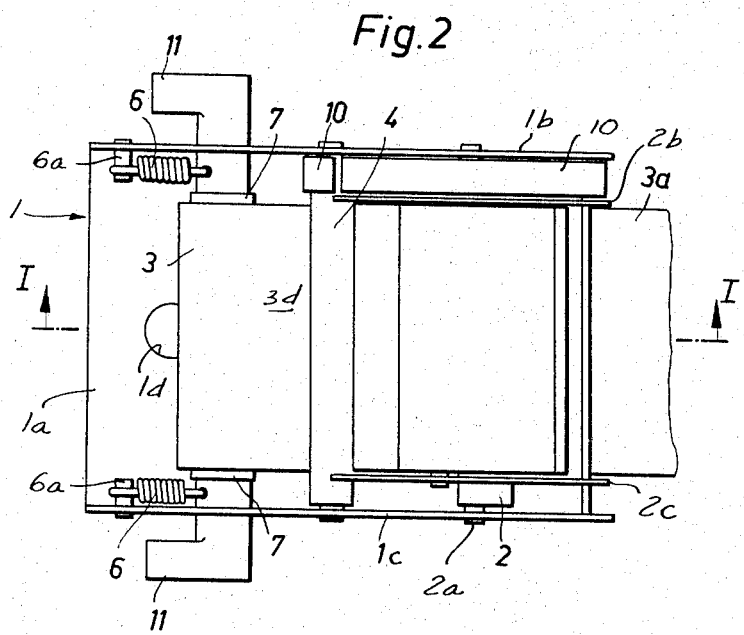
Inventors:
GÜNTHER WOHLERT
WOLFGANG WOLFF
PER-OLOF WEMAN
BY Michael J. Striker
their ATTORNEY United States Patent Office 3,375,994
Patented Apr. 2, 1968

3,375,994
WINDING DEVICE FOR SAFETY
BELTS AND THE LIKE
Guenther Wohlert, Hamburg-Wandsbek, Wolfgang Wolff, Hamburg-Rahlstedt, and Per-Olof Weman, Hamburg-Garstedt, Germany, assignors to Sigmatex AG, Basel, Switzerland
Filed Mar. 22, 1966, Ser. No. 536,448
Claims priority, application Germany, Mar. 23, 1965, S 96,122
7 Claims. (Cl. 242—107.2)

ABSTRACT OF THE DISCLOSURE

An improved automatic winding device which can collect or reel up safety belts of the type used in automotive vehicles or analogous elongated flexible elements to store them on a reel or another suitable takeup and which is provided with automatic locking or blocking means to prevent unwinding of convoluted material off the takeup when such unwinding is not desirable or harmful.

It is already known to provide automotive vehicles with safety belts which can be automatically collected by a winding device to insure that, whenever not in actual use, the belt will not lie around to cause discomfort to the occupant or occupants of the vehicle. As a rule, a conventional winding device is constructed and assembled in such a way that, as soon as one end of a belt is disconnected from a buckle or from another belt, the exposed length of the belt is automatically convoluted on a reel or a similar takeup to insure that the belt occupies little room, that the belt is less likely to be smudged, and that the belt is at hand because the occupant is familiar with the location of the winding device.

It is also known to equip such winding devices with a locking assembly which automatically prevents unwinding of the non-withdrawn length of a safety belt in the course of an accident, for example, when the person using the belt is hurled forwardly or sideways and his or her body exerts a strong pull upon the withdrawn or exposed portion of the belt. As a rule, such locking assemblies comprise presser members which can be shifted into direct and very strong frictional or clamping engagement with the takeup reel or with the convoluted portion of a belt. Therefore, and since such locking assemblies must withstand exceptionally strong forces which tend to unwind the convoluted part of a belt, not only the takeup but also the presser member must be very rugged, bulky and heavy. Such construction of a belt winding device is undesirable, particularly in a compact car, because the winding device will occupy too much room and will interfere with freedom of movement of occupants. This is one of the reasons why such automatic locking assemblies failed to gain widespread acceptance by the manufacturers of automotive vehicles.

Accordingly, it is an important object of the present invention to provide a novel winding device for safety belts and the like which is of very simple, lightweight and compact design so that it will occupy little room and may be readily accommodated in desired numbers not only in relatively large and roomy automotive vehicles but also in medium-size compact cars as well as in miniature cars without causing discomfort to occupants and without necessitating any alterations in the customary design of such vehicles.

Another object of the invention is to provide the improved winding device with a novel locking assembly which can automatically prevent uncontrolled withdrawal or unwinding of the convoluted portion of a safety belt to insure than an occupant who has the belt applied around his or her body is safely held by the belt in the event of an accident as well as when the driver must apply the brakes without warning in order to forestall an accident.

A further object of the invention is to provide a locking assembly of the just outlined characteristics which adds little to the bulkiness of the winding device so that its utilization in the winding device does not unduly increase the space requirements of the entire unit.

Still another object of the invention is to provide a locking assembly which is of very simple construction, which can be readily manipulated by persons having little technical skill and failing to understand the exact construction of the winding device, and which can be readily installed in many types of presently known winding devices.

A concomitant object of the invention is to provide a locking assembly for winding devices of the above outlined character which is constructed and assembled in such a way that it need not engage the takeup and/or the convoluted belt to make sure that the takeup which, as a rule, occupies the major part of total space required by the winding device, need not be made even bulkier just because the winding device is provided with a safety locking assembly.

An additional object of the invention is to provide a locking assembly whose operation is fully automatic and which can be rendered inactive in a very simple, convenient and time-saving manner without necessitating the exertion of a substantial force on the part of the user.

Briefly stated, one feature of the present invention resides in the provision of an automatic winding or convoluting device for safety belts and similar elongated flexible elements. The safety device comprises a support which may resemble a U-shaped housing having two spaced side walls and a base adapted to be affixed to a seat or to a component part of the vehicle body in the compartment occupied by the passengers and/or driver, a takeup which may resemble a flanged or flangeless reel and is rotatably mounted in the support, preferably by having its ends journalled in the aforementioned side walls, biasing means preferably including one of more torsion springs serving to transmit torque to the reel so that the latter tends to rotate in a predetermined direction, a pair of presser members mounted in the support in such a way that one thereof may be located between the reel and the other presser member to constitute a back support and that the other presser member is movable with reference to the support from a normal first position to a second position in a direction toward the one presser member, and an elongated flexible element one end of which is affixed to the reel so that the torsion spring tends to convolute the flexible element onto the reel. The other end of the flexible element normally extends from the support and may be provided with one component of a buckle which enables the user to couple such other end to the complementary component of a buckle provided at the free end of a second flexible element. The flexible element further comprises a first intermediate portion which is trained around the other presser member and a second intermediate portion which extends between the two presser members. When the body of a user exerts a strong pull upon the other end of the flexible element (it being assumed that the flexible element is a safety belt), the pull causes the first intermediate portion to displace the other presser member in a direction toward the one presser member whereby the two members grip or clamp the second intermediate portion and prevent unwinding of the flexible element from the reel despite the fact that neither of the two presser members actually engages the reel or the convoluted part of the flexible element. The device further comprises yieldable means, e.g., one or more springs, for permanently biasing the other presser member to its first position.

The novel features which are considered as characteristic of the invention are set forth in particular in the appended claims. The improved winding device itself, however, both as to its construction and its mode of operation, together with additional features and advantages thereof, will be best understood upon perusal of the following detailed description of a specific embodiment with reference to the accompanying drawings, in which:

FIG. 1 is a longitudinal central section through a winding device which embodies the present invention, the section being taken in the direction of arrows as seen from the line I—I of FIG. 2;

FIG. 2 is a top plan view of the winding device;

Figure 3A:
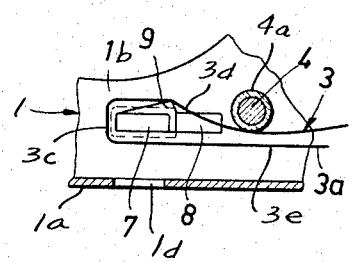
FIG. 3a is a fragmentary longitudinal section through the winding device and illustrates the other presser member in its first position at a maximum distance from the one presser member.

Referring to the drawings in detail, and first to FIGS. 1 and 2, there is shown a winding device for a safety belt 3. This winding device comprises a support here shown as a substantially U-shaped housing 1 having a base 1a and two spaced side walls 1b, 1c. Screws or similar fasteners (not shown) may be introduced through one or more openings 1d in the base 1a to fix the housing 1 to seat or to another part in the compartment or cabin of an automotive vehicle. The side walls 1b, 1c support the ends of a shaft 2a which forms part of a takeup here shown as a reel 2 having two disk-shaped flanges 2b, 2c for a length of the convoluted belt 3. A coiled torsion spring 10 serves to bias the reel 2 so that the latter tends to rotate in a counterclockwise direction, as viewed in FIG. 1, and thereby tends to collect the belt 3 in the space between the flanges 2b, 2c. One end of the torsion spring 10 is anchored in the core of the reel 2 and the other end of this spring is bent around a first presser member or back support 4 which is adjacent to the flanges 2b, 2c and whose ends are journalled in the side walls 1b, 1c. In the illustrated embodiment, the presser member 3 resembles an idler roller which is rotatable with reference to the housing 1 and is sufficiently spaced from the flanges 2b, 2c to permit unobstructed rotation of the reel in response to torque transmitted by the torsion spring 10 or in the opposite direction. This roller 4 is disposed between the reel 2 and a second presser member 7 which is also mounted in the housing 1 and is reciprocable toward and away from the roller 4. The end portions of the presser member 7 are guided in elongated cutouts or slots 8 provided therefor in the side walls 1b, 1c. It will be noted that the slots 8 are in registry with each other and extend sufficiently close to the roller 4 to insure that the minimum distance between the periphery of this roller and the presser member 7 is less than the thickness of the belt 3.

The presser member 7 is biased by two yieldable elements here shown as helical contraction springs 6 each of which has one of its ends attached to a suitable anchoring pin 6a. The springs 6 tend to maintain the presser member 7 in a first end position which is shown in FIGS. 1, 2, 3a and 3b whereby the end portions of the member 7 are accommodated in specially configurated enlarged portions 9 of the slots 8. These enlarged portions 9 are dimensioned in such a way that the presser member 7 is tiltable from the position of FIG. 3a to the locked position shown in FIG. 3b from which the member 7 cannot move toward the roller 4. Its right-hand side face then abuts against a pair of shoulders 9a provided on the side walls 1b and 1c. FIG. 1 shows that the spring 6 are coupled to the presser member 7 in such a way that, when in its aforementioned first end position, this member is automatically tilted to locked position so that, in the absence of a strong pull upon the free end 3a of the belt 3, this member 7 cannot leave its locked position unless the user decides to turn one of two handgrip portions 11 which are integral with the ends of the presser member 7 and extend outwardly beyond the side walls 1b, 1c.

The second or inner end 3b of the belt 3 is coupled to the core of the reel 2, for example, in a manner as shown in FIG. 1, and this belt comprises a first intermediate portion 3c which is trained around the presser member 7. A second intermediate portion 3d of the belt 3 extends between the presser member 7 and the roller 4.

The roller 4 and/or the presser member 7 may be provided with a mantle 4a of friction-generating material.

The belt 3 comprises a third intermediate portion 3e which is located between the free end 3a and the first intermediate portion 3c and is substantially parallel with that length of the belt which extends between the core of the reel 2 and the roller 4. It will be noted that the intermediate portion 3d is nearer to the reel than the intermediate portion 3c.

The operation of the improved winding device is as follows:

When the belt 3 is not in use, the spring 10 is free to rotate the reel 2 so that the belt is collected in the space between the flanges 2b and 2c. The free end 3a of the belt carries one component of a suitable buckle (not shown) so that it may be coupled to the free end of a second belt or to a suitable retaining device affixed to the seat, or any other suitable part of the vehicle. In the absence of a pull upon the end portion 3a, the springs 6 are free to contract and hold the presser member 7 at a maximum distance from the roller 4, and the springs 6 simultaneously tend to tilt the member 7 to the locked position of FIG. 3b in which this member 7 abuts against the shoulders 9a.

Figure 3B:
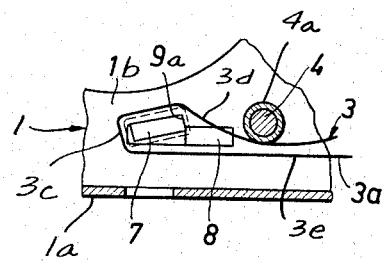
FIG. 3b is a similar fragmentary sectional view and illustrates the other presser member in locked position.

The tilting action of the springs 6 can be overcome by the bias of the torsion spring 10 so that the presser member 7 may be unlocked by being tilted from the position of FIG. 3b back to the position of FIG. 3a when the free end 3a of the belt 3 is held against further movement toward the member 7, for example, when the aforementioned component of the buckle is caused to actually abut against a transversely extending apertured plate 1e of the housing 1. In such position of the presser member 7, the locking assembly including the parts 4, 6 and 7, is ineffective and, if he so desired, the user can exert upon the end 3a of the belt a normal pull in a direction as indicated by the arrow P so that the belt may be payed out and applied around the body of the user in a manner well known from the art of safety belts for automotive vehicles. Such pull upon the end portion 3a causes the intermediate portion 3c to move into stronger frictional engagement with the left-hand portion of the presser member 7 and thereby assists the tilting action of the springs 6 to maintain the member 7 in the locked position of FIG. 3b. Consequently, the user can readily withdraw the belt by exerting on the end 3a a pull which is just sufficient to overcome the action of the torsion spring 10.

Once the user has withdrawn a sufficient length of the belt 3, and once the free end 3a is coupled to the free end of a second belt, the pull upon the belt is terminated so that the spring 10 tends to wind the belt back onto the core of the reel 2. Consequently the intermediate portions 3c and 3d are under tension because the spring 10 tends to rotate the reel 2 in a counterclockwise direction and the intermediate portion 3 tilts the presser member 7 from the locked position of FIG. 3b to the first end position of FIG. 3a in which the member 7 is free to move toward the roller 4 as soon as it overcomes the bias of the springs 6. It will be seen that, while the bias of the springs 6 can be stronger than the bias of the spring 10 in a sense that the springs 6 maintain the presser member 7 in the end position of FIG. 3a, the spring 10 is strong enough to effect unlocking of the member 7 against the tilting action of the springs 6 if the pull upon the free end 3a of the belt 3 is terminated.

Figure 3C:
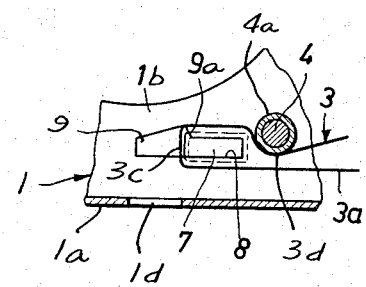
FIG. 3c is a third fragmentary sectional view and illustrates the other presser member in clamping position in which an intermediate portion of the flexible element is gripped or clamped between the two presser members.

If the vehicle is involved in an accident, or if the driver must apply the brakes without due warning to the occupants, the body of the person using the belt 3 surges forward or sideways and transmits to the free end 3a a sudden and very strong pull which causes the intermediate portion 3c to shift the presser member from the position of FIG. 3a to the second end position of FIG. 3c in which the intermediate portion 3d is strongly clamped between the members 4 and 7 so that these members prevent further unwinding of the belt and insure that the user remains in his or her seat. The stronger the impact of the body against the free end 3, the stronger is the clamping force of the presser member 7, and such clamping force is taken up by the roller 4 so that the reel 2 is not involved in the clamping action. Therefore, the reel 2 need not be overdimensioned because any stresses which arise in an emergency are taken up solely by the housing 1, by the roller 4, by the presser member 7, and by that length of the belt 3 which is not convoluted on the reel.

The handgrip portions 11 constitute an optional feature of the improved winding device because, as a rule, all necessary movements of the presser member 7 can be effected by the springs 6 and/or by the belt 3 in response to pull upon the end 3a or in response to torque transmitted by the spring 10.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. An automatic winding device for safety belts and analogous flexible elements comprising a support; a takeup turnably mounted on said support; biasing means cooperating with said takeup for transmitting a torque thereto; a first presser member stationarily mounted on said support; slot means provided in said support and having an enlarged end portion spaced from said first presser member and extending from said enlarged end portion toward said first presser member; a second presser member reciprocable in said slot means between a first position located in said enlarged end portion to a second position closely adjacent to said first presser member, said second presser member being in said first position tiltable to a locked position in which it is held against movement toward said first presser member; yieldable means connected to said second presser member for biasing the latter away from said first presser member; and an elongated flexible element having a first end connected to said takeup so that said biasing means normally tends to convolute said element onto said takeup, said element further comprising a second end normally extending from said support, a first intermediate portion trained about said second presser member, and a second intermediate portion extending between said presser members so that, in response to a pull upon said second end strong enough to overcome the bias of said yieldable means, said second presser member is moved by said first intermediate portion toward said first presser member and said second intermediate portion is clamped between said members.

2. An automatic winding device as set forth in claim 1, wherein said support comprises a housing having two spaced side walls, said slot means comprises a pair of registering slots respectively formed in said side walls of said housing, and said yieldable means comprises at least one spring mounted in said housing and arranged to bias said second presser member away from said first presser member.

3. An automatic winding device as set forth in claim 2, wherein said first presser member is a roller journaled in said side walls adjacent to said takeup.

4. An automatic winding device as set forth in claim 2, wherein said takeup comprises a reel having ends journaled in said side walls and said biasing means comprises torsion spring means tending to rotate said reel in the direction to wind up said element.

5. An automatic winding device as set forth in claim 2, wherein said second presser member comprises at least one handgrip portion extending beyond one of said side walls and adapted to facilitate manual turning of said second presser member to and from said locked position.

6. An automatic winding device as set forth in claim 2, wherein said spring is arranged to bias said second presser member to said locked position when said second presser member enters said enlarged portions of said slots.

7. An automatic winding device as set forth in claim 6 wherein said takeup comprises a reel having ends journalled in said side walls, said biasing means comprising torsion spring means tending to rotate said reel in a predetermined direction and wherein, when said second end of said flexible element is held against the bias of said torsion spring means, the tension transmitted by said torsion spring means to said first intermediate portion automatically unlocks said second presser member in said enlarged portions of said slots against the opposition of said spring so that said second presser member is movable toward said first presser member.

References Cited

UNITED STATES PATENTS

| 3,341,150 | 9/1967 | Board et al. | 242—107.2 |
| 3,205,004 | 9/1965 | Spouge | 297—388 |
| 3,249,386 | 5/1966 | Board et al. | 297—388 |

WILLIAM S. BURDEN, *Primary Examiner.*